Jan. 15, 1929.
W. B. ROBE
1,699,312
AUTOMOBILE SPRING CONSTRUCTION
Filed Aug. 7, 1923
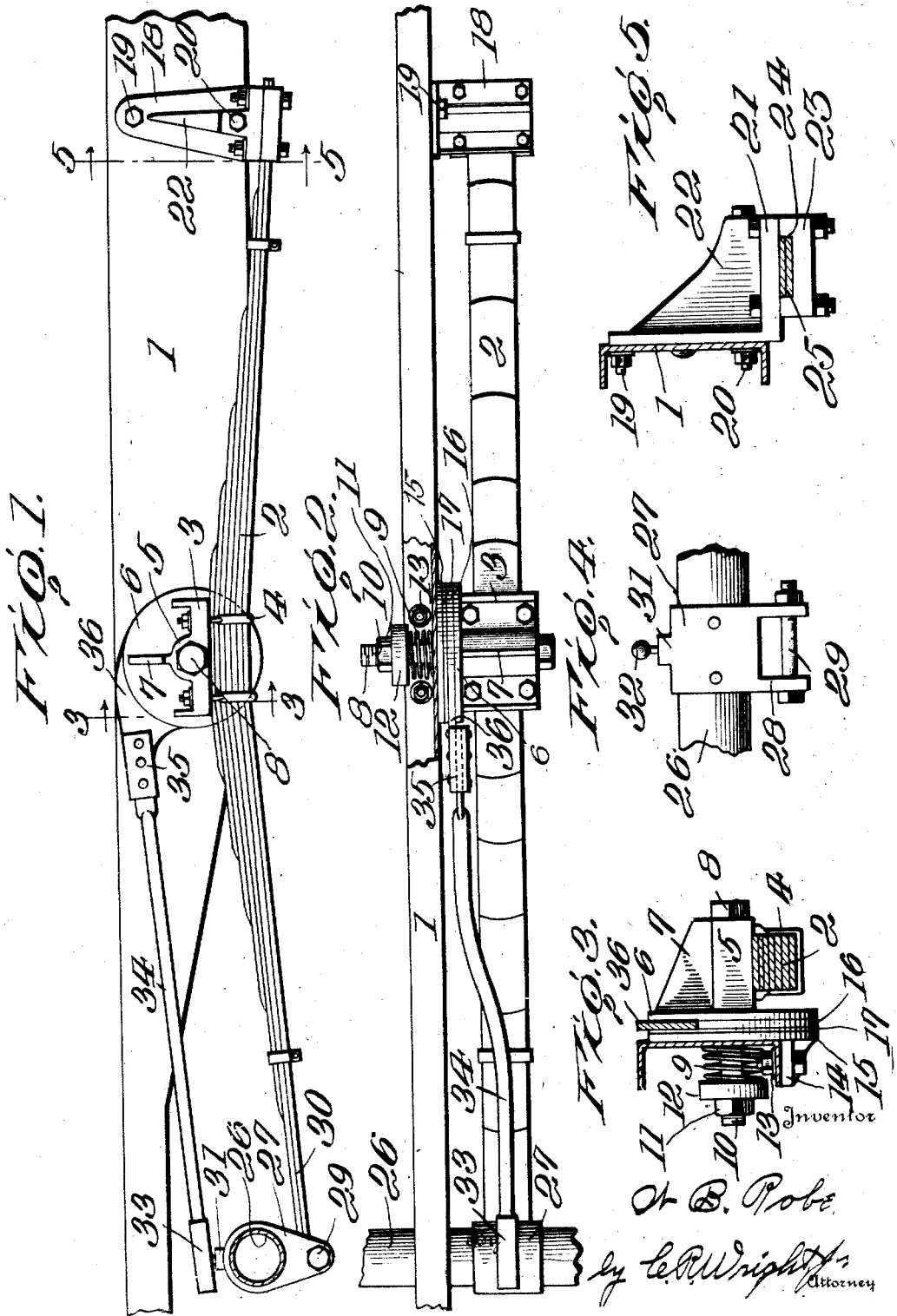

Patented Jan. 15, 1929.

1,699,312

UNITED STATES PATENT OFFICE.

WALTEN B. ROBE, OF NORFOLK, VIRGINIA.

AUTOMOBILE-SPRING CONSTRUCTION.

Application filed August 7, 1923. Serial No. 656,217.

My invention relates to improvements in automobile spring constructions.

The object of my invention is to provide a spring construction having combined therewith an equalizer and shock absorber which slows up the action of the spring and prevents a hammer blow on any part of the driving or other mechanism of the automobile and at the same time gives an equalizing effect, so that all of the springs receive approixmately the same amount of shock regardless of the position of the load in the automobile.

Another object of my invention is to provide a spring construction for automobiles in which all four springs are of the same size and design and each spring forming a unit in itself which does not depend on other torque or radius rods and prevents distortion in the general construction of the automobile.

A further object of my invention is to provide a spring construction which will not distort the frame and allow of the construction of an automobile with a perfectly rigid frame and at the same time providing a much smoother running automobile in which the shocks of the road are not imparted to the body.

A still further object of my invention is to provide a spring construction which can be readily applied to the ordinary automobile and any of the parts replaced or repaired and at the same time provide a cheap, simple and effective structure having certain details of structure and combination of parts hereinafter more fully described.

In the accompanying drawings:

Figure 1 is a side elevation showing my improved spring construction applied to the chassis of an automobile.

Figure 2 is a top plan view of Figure 1.

Figure 3 is a transverse sectional view taken on the line 3—3 looking in the direction of the arrow of Figure 1.

Figure 4 is an end view of the spring shackle for connecting it to the axle.

Figure 5 is an end view of the connection between the springs and the chassis.

Referring now to the drawings; 1 represents the U-beam of the chassis of the automobile and to which my improved spring 2 is pivotally connected as will be hereinafter more fully described. The springs 2 are constructed exactly alike for both the front and rear axles and in my description I will describe a single spring.

The spring 2, as shown in Figure 1 of the drawings, has connected at its center the plate 3 rigidly connected to the spring by means of the clips 4. The plate 3 is provided with an elongated hub portion 5 strengthened and connected to the disk 6 by means of the ribs 7, all of which is fully shown in Figures 1, 2 and 3 of the drawings. The hub portion 5 is provided with a horizontally arranged opening through which passes the bolt 8, said bolt also passing through the disk 6 and through the chassis of the frame of the machine. Surrounding the bolt 8 on the inside of the U-shaped beam 1 of the chassis is a coil spring 9 and the outer end of the bolt 8 is provided with a threaded portion 10 upon which is screwed a nut 11 bearing against the washer 12 which engages the spring 9 and whereby the tension of the spring 9 may be varied as will be hereinafter more fully described. Secured to the lower flange 13 of the U-beam of the chassis is a frame plate 14 which comprises an enlarged disk shaped portion 15. Carried by the disk 6 is a friction plate 16 and arranged between the disk shaped portion 15 carried by the frame plate and the friction plate 16 is a friction washer 17, and by my structure it will be seen that the spring 2 is pivotally supported upon the bolt 8 and free to rotate on, as there is little or no friction between the outer face of the plate 16 and the inner face of the plate 6. As heretofore described, the tension of this spring can be varied by tightening or loosening the nut 11. The inner end of the spring 2 is supported by the spring support 18 which is bolted to the U-beam of the chassis by means of the bolts 19 and 20. The lower end thereof is provided with a laterally extending portion 21 strengthened by the web 22 and has clamped to its lower face the plate 23 leaving a space 24 between the same and the laterally turned portion 21 of the spring support. The end of the spring 2 extends into this space and has a sliding movement therein, as indicated at 25.

The axle 26 has rigidly secured thereon the member 27, which has its lower end bifurcated, as indicated at 28 and provided with a bolt 29 which passes through the eye carried by the outer end 30 of the spring 2.

Thus the inner end of the spring is supported in the usual manner. The member 27 at its upper end is provided with a boss 31 having an upwardly extending portion provided with a ball 32, which extends into and is connected with the socket 33 carried by the equalizer and torsion rod 34.

The inner end of the torsion rod 34 is rigidly connected, as indicated at 35, to the outwardly extending arm 36 formed integral with the friction plate 16.

From the foregoing description it will be seen that the spring 2 is pivotally supported upon the bolt 8 at its center and one end connected rigidly to the axle and the opposite end having a sliding connection with the chassis. The equalizer and torsion rod 34 having the ball and socket connection with the axle above the same, rigidly connected to the friction plate. The shocks on the axle are also transmitted through the equalizer and torsion rod and are taken up through the tension of the spring 9 on the friction plate 16 and thus there is a cooperation between the spring and the equalizer and torsion rod for one to take up the shocks of the other and thus prevent the usual hammer blow caused by the wheels striking an obstruction and being imparted to the chassis of the automobile.

Having thus described my invention, what I claim is:

1. The combination with a chassis, of a spring pivotally mounted intermediate its ends thereto and having one end connected with the chassis and pivotally connected at the opposite end to the axle, and an equalizer mounted upon the pivot of the spring and having a rigid arm connected to the axle.

2. The combination with a chassis, of a spring pivotally mounted intermediate its ends thereto and having one end connected with the chassis and pivotally connected at the opposite end to the axle, and an equalizer mounted upon the pivot of the spring and having a rigid arm having a ball and socket connection with the axle.

3. The combination with a chassis, of a spring pivotally mounted intermediate its ends thereto and having one end connected with the chassis and pivotally connected at the opposite end to the lower face of the axle, and an equalizer mounted upon the pivot of the spring and having a rigid arm having a ball and socket connection with the upper face of the axle.

4. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means and having a rigid arm having a ball and socket connection with the other face of the axle.

5. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means for engaging means rigidly connected to the chassis and having a rigid arm having a ball and socket connection with the opposite face of the axle.

6. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means for engaging means rigidly connected to the spring and chassis and having a rigid arm having a movable connection with the opposite face of the axle.

7. The combination with a chassis, of a spring pivotally mounted intermediate its ends thereto and having one end connected with the chassis and pivotally connected at the opposite end to one face of the axle, said spring having an enlarged guide plate surrounding the pivot, a correspondingly shaped friction plate carried by the chassis, and an equalizer having a friction plate between the two heretofore mentioned friction plates, and having a rigid arm extending forwardly and having a movable connection with the opposite face of the axle.

8. The combination with a chassis, of a spring pivotally mounted intermediate its ends thereto and having one end connected with the chassis and its opposite end pivotally connected to one face of the axle, a guide plate carried by the spring and surrounding the pivot, a friction plate carried by the chassis, an equalizer having a friction plate between the two heretofore mentioned friction plates and having a rigid arm extending forwardly and movably connected to the opposite face of the axle, and a second spring surrounding the pivot of the spring on the inside of the chassis for frictionally holding the equalizer between the guide plate carried by the spring and the chassis.

9. The combination with a chassis, of a spring pivotally supported upon a bolt carried by the chassis and having one end connected with the chassis and the opposite end pivotally connected to one face of the axle, of an enlarged guide disk rigidly carried by the spring and surrounding the pivot thereof, a friction disk carried by the chassis, an equalizer pivotally mounted upon the pivot of the spring between the two before mentioned friction disks and having a rigid arm extending forwardly and movably connected to the opposite face of the axle, the pivot of the spring extending through the chassis and having a coil spring surrounding the same, and a nut and washer for compressing said spring whereby the equalizer is frictionally retarded between the disks carried by the chassis and the spring.

10. The combination with a chassis, of a semi-elliptical spring pivotally mounted intermediate its ends thereto and having one end connected with the chassis and pivotally connected at the opposite end to the axle, and an equalizer mounted upon the pivot of the spring and having a rigid arm connected to the axle.

11. The combination with a chassis, of a semi-elliptical spring pivotally mounted intermediate its ends thereto and having one end connected with the chassis and pivotally connected at the opposite end to the axle, and an equalizer mounted upon the pivot of the spring and having a rigid arm having a ball and socket connection with the axle.

12. The combination with a chassis, of a semi-elliptical spring pivotally mounted intermediate its ends thereto and having one end connected with the chassis and pivotally connected at the opposite end to one face of the axle, and an equalizer mounted upon the pivot of the spring and having a rigid arm having a ball and socket connection with the opposite face of the axle.

13. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means for engaging means rigidly connected to the chassis and having a rigid arm connected with the opposite face of the axle.

14. The combination with a chassis of a spring attached to the chassis and having one end connected to the axle, and an equalizer mounted on the spring attaching means, and having a rigid arm connected to the axle.

15. The combination with a chassis, of a spring mounted intermediate its ends thereto, and having one end connected with the chassis and connected at the opposite end to the axle, and an equalizer carried by the chassis at the point of connection with the spring, and having a rigid arm connected to the axle.

16. The combination with a chassis, of a spring mounted intermediate its ends on the chassis, and having one end connected thereto, and the opposite end connected to the axle, and an equalizer connected to the chassis concentric with the central connection of the spring, and a rigid arm connecting the equalizer and the axle.

17. The combination with a chassis, of a spring attached intermediate its ends to the chassis and having one end connected with the chassis and its opposite end connected with the axle, and an equalizer mounted upon the spring attaching means and having a rigid arm connected to the axle.

18. The combination with a chassis, of a spring attached intermediate its ends to the chassis and having one end connected to the chassis and the opposite end connected to the axle, and a pivoted equalizer mounted on the spring attaching means and having a rigid arm connected to the axle.

19. The combination with a chassis, of a spring pivotally mounted intermediate its ends thereto and having one end connected with the chassis and pivotally connected at the opposite end to the axle, and an equalizer mounted upon the pivot of the spring and having a rigid arm connected to the axle.

20. The combination with a chassis, of a spring pivotally mounted intermediate its ends thereto and having one end connected with the chassis and pivotally connected at the opposite end to the axle, and an equalizer mounted upon the pivot of the spring and having a rigid arm having a ball and socket connection with the axle.

21. The combination with a chassis, of a spring pivotally mounted intermediate its ends thereto and having one end connected with the chassis and pivotally connected at the opposite end to the lower face of the axle, and an equalizer mounted upon the pivot of the spring and having a rigid arm having a ball and socket connection with the upper face of the axle.

22. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means and having a rigid arm having a ball and socket connection with the other face of the axle.

23. The combination with a chassis, of a semi-elliptical spring pivotally mounted intermediate its ends thereto and having one end connected with the chassis and pivotally connected at the opposite end to the axle, and an equalizer mounted upon the pivot of the spring and having a rigid arm connected to the axle.

24. The combination with a chassis, of a semi-elliptical spring pivotally mounted intermediate its ends thereto and having one end connected with the chassis and pivotally connected at the opposite end to the axle, and an equalizer mounted upon the pivot of the spring and having a rigid arm having a ball socket connection with the axle.

25. The combination with a chassis, of a semi-elliptical spring pivotally mounted intermediate its ends thereto, and having one end connected with the chassis and pivotally connected at the opposite end to one face of the axle, and an equalizer mounted upon the pivot of the spring and having a rigid arm having a ball and socket connection with the opposite face of the axle.

26. The combination with a chassis, of a spring pivotally mounted intermediate its ends thereto and having one end connected with the chassis and pivotally connected at the opposite end to one face of the axle, and an equalizer mounted upon the pivot of the spring and having a rigid arm connected to the opposite face of the axle.

27. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means for engaging the chassis and having a rigid arm connection with the opposite face of the axle.

28. The combination with a chassis, of a spring pivotally mounted intermediate its ends to the chassis and having one end connected with the chassis and pivotally connected to the opposite end to one face of the axle, and an equalizer pivotally mounted upon the pivot of the spring and having friction means for engaging the chassis and having a rigid arm having a movable connection with the opposite face of the axle.

29. The combination with a chassis, of a spring attached intermediate its ends to the chassis and having one end connected to the chassis and the opposite end connected to the axle, an equalizer composing friction disks pivotally mounted on the spring attaching means, and a rigid arm connected to one of said disks and to the axle.

In testimony whereof, I have signed this specification.

WALTEN B. ROBE.